United States Patent [19]

Fuchigami

[11] Patent Number: 4,871,277

[45] Date of Patent: Oct. 3, 1989

[54] JOINT ASSEMBLY

[75] Inventor: Yasuhiro Fuchigami, Osaka, Japan

[73] Assignee: Nippon Sheet Glass Co., Ltd., Osaka, Japan

[21] Appl. No.: 211,547

[22] Filed: Jun. 24, 1988

[30] Foreign Application Priority Data

Jun. 25, 1987 [JP] Japan ............................. 62-97563[U]

[51] Int. Cl.$^4$ .............................................. F16D 1/00
[52] U.S. Cl. .................................... 403/166; 403/317; 403/348; 464/134; 464/901
[58] Field of Search ............... 403/348, 349, 317, 166, 403/182, 183, 336, 287, DIG. 4; 464/901, 134, 136

[56] References Cited

U.S. PATENT DOCUMENTS

| | | | |
|---|---|---|---|
| 3,345,711 | 10/1967 | McCarthy | 403/166 X |
| 3,675,499 | 7/1972 | Marosy | 403/348 X |
| 3,963,361 | 6/1976 | Schenk | 403/349 X |
| 4,124,999 | 11/1978 | Hirasawatsu | 464/182 X |
| 4,431,334 | 2/1984 | Cleveland et al. | 464/134 X |
| 4,661,009 | 4/1987 | Tripp | 403/349 |

FOREIGN PATENT DOCUMENTS 948872 2/1964 United Kingdom .

Primary Examiner—Randolph A. Reese
Assistant Examiner—J. Russell McBee
Attorney, Agent, or Firm—Lowe, Price, Leblanc, Becker & Shur

[57] ABSTRACT

A joint assembly interconnecting first and second rotatable shafts includes an engaging member mounted on a shaft portion of the first rotatable shaft, a tubular assembly including a first tubular member in which the shaft portion is coaxially inserted and which has an engaged member for engaging the engaging member, and a second tubular member coupled to the second rotatable shaft, and an urging assembly disposed in the first tubular member for normally urging the first tubular member and the first rotatable shaft axially away from each other to keep the engaging member and the engaged member in engagement with each other. The engaged member has a central through hole through which the first rotatable shaft is inserted, and holes extending radially from the central through holes for allowing the engaging member to be axially inserted therethrough, for thereby permitting the first rotatable shaft to be connected to and disconnected from the joint assembly.

10 Claims, 3 Drawing Sheets

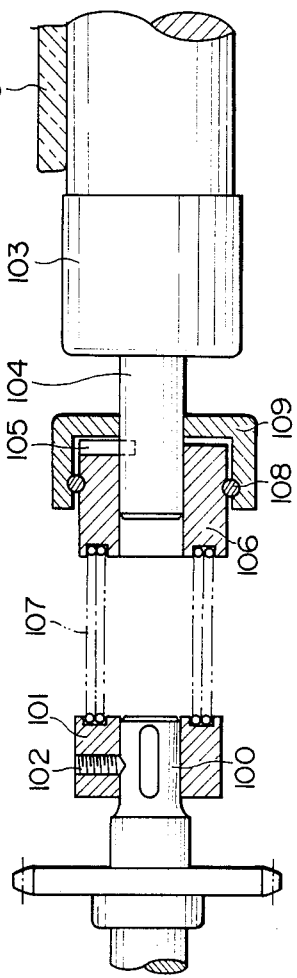
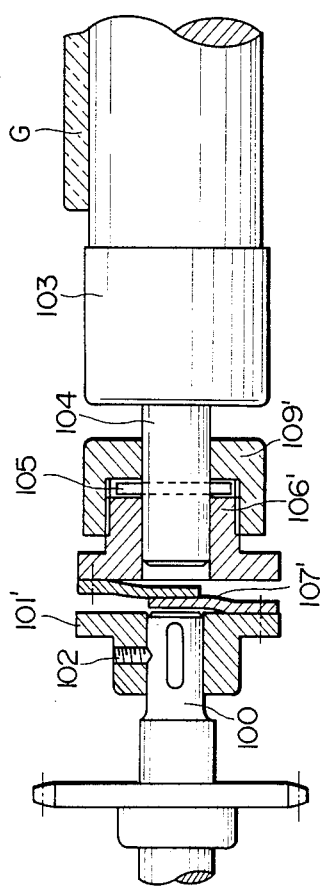

4,871,277

JOINT ASSEMBLY

BACKGROUND OF THE INVENTION

1. Field of the Invention

The present invention relates to a joint assembly for connecting two rotatable shafts coaxially to each other, and more particularly to a joint assembly for coupling a driver shaft of a rotative drive source to a driven shaft of a driven member such as a roll for conveying a glass sheet or the like.

2. Description of the Relevant Art

Generally, glass sheets are fed through a heating furnace by feed rolls. The feed rolls are rotated about their own axes by rotative power transmitted from a rotative drive source such as a motor a driven shaft of one of the feed rolls. The driver shaft of the rotative drive source is coupled to the driven shaft of the feed roll by a joint assembly.

FIGS. 6 and 7 are conventional joint assemblies used to connect driver and driven shafts coaxially to each other.

The joint assembly of FIG. 6 comprises a sleeve 101 fixed to an end of a driver shaft 100 by a key (not shown) and a setscrew 102, a pin 105 mounted radially on a driven shaft 104 of a feed roll 103, a sleeve 106 mounted on the driven shaft 104 and engaging the pin 105 on a side thereof facing away from the driver shaft 100, a cap 109 fitted over the sleeve 106 and disposed on a side thereof facing the feed roll 103 with a retaining ring 108 interposed between the cap nut 109 and the sleeve 106, and a coil spring 107 coupling and disposed sleeves 101, 106.

The joint assembly illustrated in FIG. 7 comprises a sleeve 101' fixed to an end of a driver shaft 100 by a key (not shown) and a setscrew 102', a pin 105 mounted radially on a driven shaft 104 of a feed roll 103, a sleeve 106' mounted on the driven shaft 104 and engaging the pin 105 on a side thereof facing away from the driver shaft 100, a cap nut 109' fitted over the sleeve 106' and disposed on a side thereof facing the feed roll 103, and a leaf spring 107' coupling disposed between the sleeves 101', 106'.

A glass sheet G can be fed along by either of the feed rolls 103 shown in FIGS. 6 and 7. With the joint assemblies of FIGS. 6 and 7, there is a slight gap or backlash between the pin 105 and the sleeve 106 or 106' engaging the pin 105. Therefore, when the feed speed is varied or the glass sheet G is moved reciprocally back and forth, a play or backlash is developed between the pin 105 and the sleeve 106 or 106', causing a roll mark or scratch to be produced on the surface of the glass sheet G. The pin 105 and the sleeve 106 or 106' are held in engagement with each other by the cap 109 or the cap nut 109'. However, the cap 109 or the cap nut 109' cannot reliably be fixed to the driven shaft 104, or can easily be loosened thereon. To interconnect the shafts 100, 104 with these joint assemblies. It is necessary to use a certain types of tools, and a considerable period of time is required to install the cap 109 or 109'.

SUMMARY OF THE INVENTION

In view of the aforesaid problems of the conventional joint assemblies, it is an object of the present invention to provide a joint assembly which can reliably and easily interconnect driver and driven shafts and transmit rotative power smoothly from the driver shaft to the driven shaft without developing play or backlash even when the driver and driven shafts undergo a relative speed change.

According to the present invention, there is provided a joint assembly interconnecting first and second rotatable shafts, comprising an engaging member mounted on a shaft portion of the first rotatable shaft, a tubular assembly including a first tubular member in which the shaft portion is coaxially inserted and which has an engaged member for engaging the engaging member, and a second tubular member coupled to the second rotatable shaft, and urging means disposed in the first tubular member for normally urging the first tubular member and the first rotatable shaft axially away from each other to keep the engaging member and the engaged member in engagement with each other.

According to the present invention, there is also provided a joint assembly interconnecting first and second rotatable shafts, comprising an engaging member mounted on the first rotatable shaft, a tubular assembly having, on one end thereof, an annular coupling member coupled to the second rotatable shaft and, on an opposite end thereof, an annular engaged member having radial holes and a central through hole for allowing the first rotatable shaft and the engaging member to be axially inserted therethrough, the annular engaged member further having an engaged portion angularly spaced from the radial holes for engaging the engaging portion, and urging means disposed in the tubular assembly for normally urging the tubular member and the first rotatable shaft axially away from each other to keep the engaging member and the engaged portion of the annular engaged member in engagement with each other.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 6 is a cross-sectional view of a conventional joint assembly interconnecting two rotatable shafts; and FIG. 7 is a cross-sectional view of another conventional joint assembly interconnecting two rotatable shafts.

DETAILED DESCRIPTION OF THE PREFERRED EMBODIMENT

Figure 1:
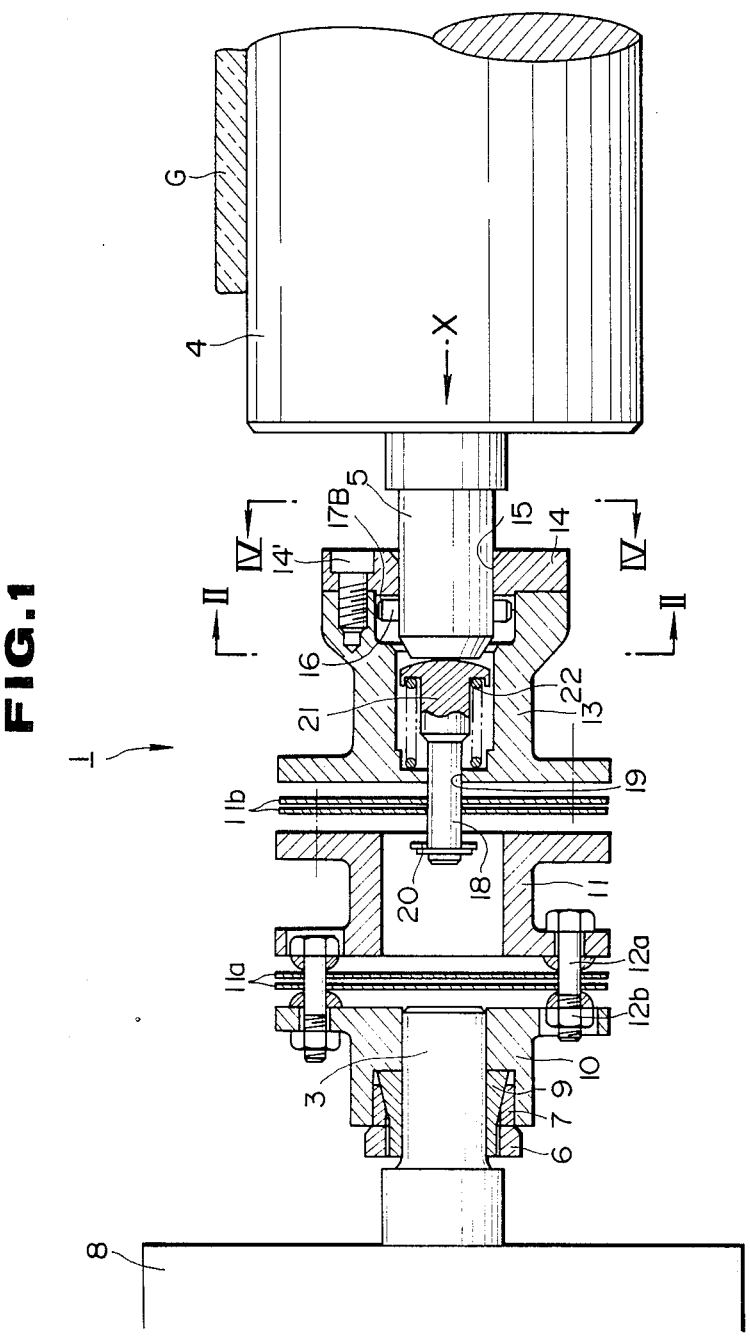
FIG. 1 is an axial cross-sectional view of a joint assembly by which two rotatable shafts are interconnected.

FIG. 1 shows a joint assembly 1 according to an embodiment of the present invention, by which two rotatable shafts are interconnected. The joint assembly 1 connects a driver shaft 3 extending as an output shaft from a gearbox 8 and operatively coupled to a rotative drive source (not shown) through a train of gears (not shown) in the gearbox 8, to a driven shaft 5 extending from a feed roll 4 for transmitting rotative power from the driver shaft 3 to the driven shaft 5. The feed roll 4 serves to feed a glass sheet G or the like, and is constructed as a ceramic roll, silica roll, a hollow metallic roll, or a solid metallic roll.

The joint assembly 1 includes a substantially annular sleeve 10 disposed on the driver shaft 3. The sleeve 10 is fixedly mounted on the driver shaft 3 by a collar 9 fitted over the driver shaft 3, a wedge collar 7 fitted over the collar 9, and a nut 6 threaded over the collar 9. The sleeve 10 is coupled to an annular socket 13 on the driven shaft 5 by means of a tubular intermediate member 11. The sleeve 10 and the intermediate member 11 are interconnected by bolts 12a and nuts 12b with springs 11a interposed therebetween. Similarly, the socket 13 and the intermediate member 11 are interconnected by bolts (not shown) with springs 11b interposed therebetween. The springs 11a, 11b are effective to absorb shaft misalignment for smooth transmission of rotative power from the driver shaft 3 to the driven shaft 5 when the driver shaft 3 and the driven shaft 5 are not coaxially positioned or are radially displaced out of coaxial alignment. These springs 11a, 11b may be replaced with any equivalent members insofar as they can absorb such shaft misalignment.

The annular socket 13 on the driven shaft 5 has an open end opening toward the feed roll 4 and closed by a cap 14, or an engaged member, fastened to the socket 13 by means of an axial bolt 14'. The cap 14 has an axial central hole 15 defined axially therethrough in which the driven shaft 5 of the feed roll 4 is inserted with the distal end of the shaft 5 coaxially extending into the socket 13.

The driven shaft 5 has an engaging member on a shaft portion near the distal end thereof. In order to engage a portion of the cap 14, the engaging member comprises a pin 16 extending diametrically through the shaft portion of the driven shaft 5 and having opposite ends projecting radially outward from the driven shaft 5.

Figure 2:
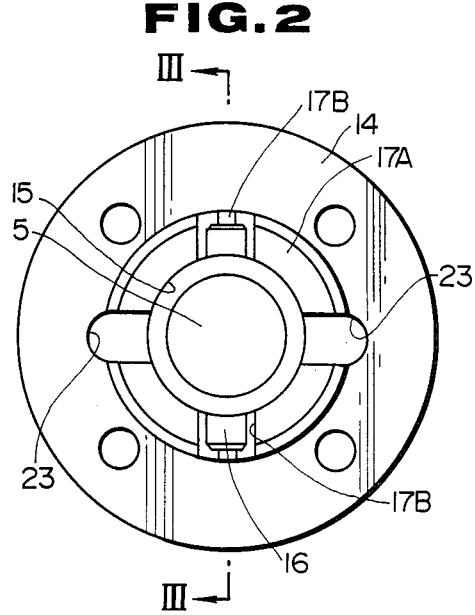
FIG. 2 is a cross-sectional view taken along line II—II of FIG. 1.
Figure 3:
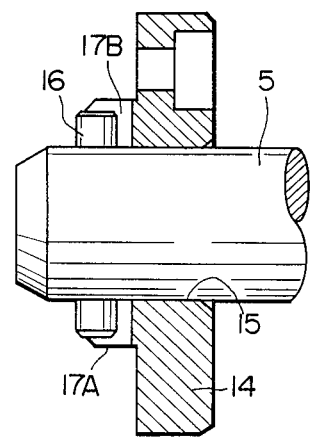
FIG. 3 is a cross-sectional view taken along line III—III of FIG. 2, showing a cap mounted on one of the shafts.
Figure 4:
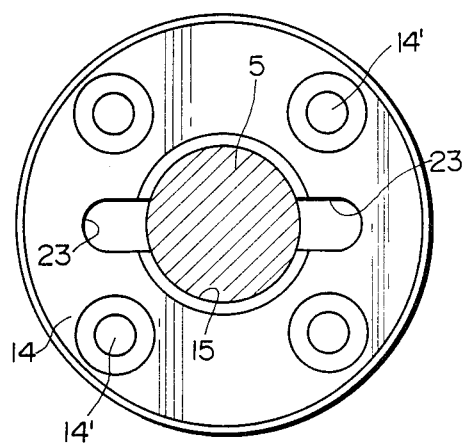
FIG. 4 is a cross-sectional view taken along line IV—IV of FIG. 1.
Figure 5:
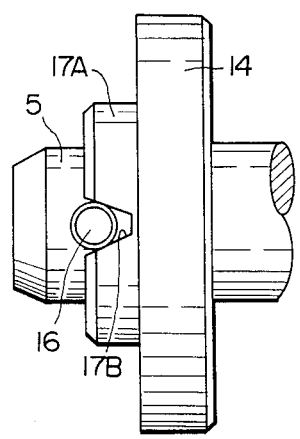
FIG. 5 is a plan view of the parts shown in FIG. 2.

The cap 14 has a boss 17A (FIGS. 2 and 3) on an inner surface thereof facing the socket 13, the boss 17A projecting into the socket 13 coaxially with the coaxial through hole 15. The boss 17A has a diametrical groove 17B defined for receiving the pin 16 therein. As shown in FIG. 5, the groove 17B has a tapered cross-sectional shape spreading in a direction toward the socket 13, such that the pin 16 received in the groove 17B is spaced a distance from the bottom of the tapered groove 17B. To allow the shaft portion of the driven shaft 5 which is inserted through the central through hole 15 into the socket 13, i.e., on which the pin 16 is mounted, to be axially pulled out of the socket 13, the cap 14 has a pair of diametrically opposite auxiliary holes 23 (FIGS. 2 and 4) defined therethrough and extending radially outwardly from the central through hole 15, the auxiliary holes 23 being angularly (90° in the illustrated embodiment) spaced circumferentially from the tapered groove 17B. The shaft driven shaft 5 can be axially removed from the socket 13 by first pushing the driven shaft 5 to the left in FIG. 1 until the pin 16 is positioned out of the groove 17B, turning the driven shaft 5 90° about its own axis to align the pin 16 with the auxiliary holes 23, and then pulling the driven shaft 5 to the right with the pin 16 passing through the auxiliary holes 23.

To keep the pin 16 seated in the tapered groove 17B, an urging means is disposed in the socket 13 for normally resiliently urging the driven shaft 5 and the socket 13 or the entire joint assembly including the socket 13 to move in directions away from each other. More specifically, the urging means comprises, as shown in FIG. 1, a pusher rod 18 disposed coaxially in the socket 13 and slidably supported in a guide hole 19 defined in an end wall of the socket 13 closer to the driver shaft 3, a pad 21 disposed on an end of the pusher rod 13 which is positioned in the socket 13, and a coil spring 22 disposed under compression between the pad 21 and an inner surface of the end wall of the socket 13. A retaining ring 20 is fitted over the end of the pusher rod 18 which projects out of the socket 13 into the intermediate tubular member 11.

When the joint assembly 1 is regarded as a static system, the driven shaft 5 is pushed to the right in FIG. 1, and as a result the pin 16 is held against a deep inner portion of the tapered groove 17B and hence remains in engagement with the boss 17A. Since the pin 16 is pressed into the tapered groove 17B at all times, no play or backlash is produced between the pin 16 and the boss 17A even when the driver shaft 3 is reversed or changes its speed of rotation.

For replacing the feed roll 4 or the like, the driven shaft 5 can be attached to and detached from the joint assembly 1 very simply as follows:

To pull the driven shaft 5 from the joint assembly 1, the feed rod 4 is pushed in the direction of the arrow X from the position shown in FIG. 1. The distal end of the shaft 5 pushes the pusher rod 18 to the left in FIG. 1 against the resiliency of the spring 22 until the pin 16 is displaced out of the tapered groove 17B. The feed roll 4 is then turned 90° about its own axis to bring the pin 16 into alignment with the auxiliary holes 23 which are 90° angularly spaced from the tapered groove 17B. Thereafter, the feed roll 4 is pulled in the direction opposite to the direction of the arrow X to remove the driven shaft 5 coaxially from the joint assembly 1. A new feed roll can also be connected to the joint assembly 1 by following a process which is a reversal of the above removal process.

While in the above embodiment the pin 16 is mounted on the driven shaft 5 of the feed roll 4, a pin may be mounted on the driver shaft 3 and a tapered groove may be defined in a suitable member of the joint assembly for engagement with the pin on the driver shaft. In such a modification, however, the joint assembly should be attached to and detached from the driver shaft while the joint assembly remains installed on the driven shaft of the feed roll.

With the arrangement of the present invention, as described above, the joint assembly which connects the driver and driven shafts to each other can transmit rotative power from the driver shaft to the driven shaft highly stably at all times. Even when the speed of rotation of the driver shaft varies, the rotative power from the driver shaft can be transmitted to the driven shaft without any play or backlash between the shafts. The driven shaft can be replaced with another driven shaft in a simple process within a short period of time without employing a special tool o tools. The joint assembly of the present invention is highly effective as a joint assembly for installation in a limited space.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A joint assembly interconnecting first and second rotatable shafts, comprising:
   an engaging member mounted on a shaft portion of the first rotatable shaft;
   a tubular assembly including a first tubular member in which said shaft portion is coaxially inserted and which has an engaged member for engaging said engaging member, and a second tubular member coupled to said second rotatable shaft; and
   urging means disposed in said first tubular member for normally urging said first tubular member and said first rotatable shaft axially away from each other to maintain said engaging member and said engaged member in engagement with each other.

2. A joint assembly according to claim 1, wherein said first tubular member includes a tubular socket in which said shaft portion of the first rotatable shaft extends, said urging means including means disposed in said tubular socket for normally pressing an end of said shaft portion relative to said tubular socket.

3. A joint assembly according to claim 2, wherein said engaged member includes an annular member fixed to an open end of said socket through which said first rotatable shaft is inserted, said annular member having a central through hole in which said first rotatable shaft is rotatably held.

4. A joint assembly according to claim 3, wherein said annular member has a groove defined in an inner surface thereof for receiving said engaging member for engagement therewith.

5. A joint assembly according to claim 4, wherein said annular member has auxiliary through holes defined therein in communication with said central through hole and circumferentially spaced from said groove for allowing said engaging member to pass axially through the auxiliary through holes to permit said first rotatable shaft to be removably attached to said first tubular member.

6. A joint assembly according to claim 4, wherein said engaging member includes a pin mounted diametrically on said first rotatable shaft, said groove extending radially from said central through hole in said annular member and having a tapered V-shape opening towards said socket.

7. A joint assembly according to claim 3, wherein said urging means includes a resilient member disposed between an opposite open end of said tubular socket and said end of said first rotatable shaft.

8. A joint assembly according to claim 7, wherein said resilient member includes a pusher rod axially slidably supported in said opposite open end of said tubular socket, and a coil spring disposed under compression between one end of said pusher rod and said opposite open end of said tubular socket for resiliently pressing said one end of the pusher rod against said end of said first rotatable shaft.

9. A joint assembly interconnecting first and second rotatable shafts, comprising:
   an engaging member mounted on the first rotatable shaft;
   a tubular assembly having, on one end thereof, an annular coupling member coupled to said second rotatable shaft and, on an opposite end thereof, an annular engaged member having radial holes and a central through hole for allowing said first rotatable shaft and said engaging member to be axially inserted therethrough, said annular engaged member further having an engaged portion angularly spaced from said radial holes for engaging said engaging portion; and
   urging means disposed in said tubular assembly for normally urging said tubular member and said first rotatable shaft axially away from each other to keep said engaging member and said engaged portion of said annular engaged member in engagement with each other.

10. A joint assembly interconnecting first and second rotatable shafts, comprising an engaging projecting member mounted on a shaft portion of the first rotatable shaft; a tubular assembly including a first tubular member in which said shaft portion is coaxially inserted and which first tubular member includes an engaged member for engaging said engaging member, and a second tubular member coupled to said second rotatable shaft; said urging means disposed in said first tubular member for normally urging said engaging member and said engaged member into engagement with each other to prevent relative slippage between the first and second rotatable shafts.

* * * * *